US006622977B1

(12) United States Patent
Boys

(10) Patent No.: US 6,622,977 B1
(45) Date of Patent: Sep. 23, 2003

(54) ANTI-TWIST CONDUIT CLAMP FOR DRIP HEAD- AND SPRINKLER HEAD-BEARING WATERING CONDUITS

(76) Inventor: Donald Robert Martin Boys, P.O. Box 1096, Bella Vista, CA (US) 96008

( * ) Notice: Subject to any disclaimer, the term of this patent is extended or adjusted under 35 U.S.C. 154(b) by 0 days.

(21) Appl. No.: 10/273,055

(22) Filed: Oct. 16, 2002

(51) Int. Cl.[7] .............................. F16L 3/04; F16L 3/12
(52) U.S. Cl. ...................... 248/87; 248/73; 248/316.5
(58) Field of Search .................... 248/71, 73, 74.1, 248/74.5, 75, 76, 87, 156, 230.4, 316.5

(56) References Cited

U.S. PATENT DOCUMENTS

| | | | | |
|---|---|---|---|---|
| 2,681,196 A | * | 6/1954 | Lind | 248/71 |
| 3,119,587 A | * | 1/1964 | Anderson | 248/75 |
| 3,430,903 A | * | 3/1969 | Mathes | 248/68.1 |
| 3,588,012 A | * | 6/1971 | Schaefer | 248/80 |
| 4,492,493 A | * | 1/1985 | Webb | 405/172 |
| 5,054,741 A | * | 10/1991 | Ismert | 248/74.5 |
| 5,158,254 A | * | 10/1992 | Remby | 248/76 |
| 5,575,445 A | * | 11/1996 | Kozdas | 248/287.1 |
| 6,343,772 B1 | * | 2/2002 | Oi | 248/75 |
| 6,527,246 B1 | * | 3/2003 | Stinnett | 248/545 |

FOREIGN PATENT DOCUMENTS

GB      2099905 A    *   12/1982

OTHER PUBLICATIONS

U.S. patent application Publication No. US 2003/0005554, Inventor: Nagayasu, Published: Jan. 9, 2003, Filed: May 29, 2002.*

U.S. patent application Publication No. US 2003/0015628, Inventor: Rivera, Published: Jan. 23, 2003, Filed: Jul. 17, 2001.*

Donald Robert Martin Boys, Hose Straightening Device for Straightening Sprinkler or Drip–Head Bearing Garden Type Hoses, USPTO, Document Disclosure #513965, Jun. 28, 2002, all US.

* cited by examiner

*Primary Examiner*—Ramon O. Ramirez
*Assistant Examiner*—Jon Szumny
(74) *Attorney, Agent, or Firm*—Donald R. Boys; Central Coast Patent Agency, Inc.

(57) ABSTRACT

In a conduit system subject to longitudinal conduit twisting, a staking device for fixing the conduit in position on a ground surface has a clamping apparatus having gripping elements on an inside surface of an opening substantially the size and shape of a cross section of the conduit, the clamping element openable to fit over the conduit and closable to clamp to the conduit such that the conduit may not rotate relative to the clamping element, a stake adapter mounted to the clamping apparatus, the stake adapter having a sleeve opening with an opening of a first size first and a longitudinal axis substantially tangential to the clamping element, and a stake having a length and substantially the first diameter to slide into the sleeve opening and into the ground surface, to pin the conduit securely to the ground surface, preventing rotation of the conduit.

7 Claims, 3 Drawing Sheets

ANTI-TWIST CONDUIT CLAMP FOR DRIP HEAD- AND SPRINKLER HEAD-BEARING WATERING CONDUITS

FIELD OF THE INVENTION

The present invention is in the field of horticultural equipment and accessories and pertains particularly to conduit clamp devices for straightening and/or preventing conduit twisting in polymer-type watering conduits.

CROSS-REFERENCE TO RELATED DOCUMENTS

A Disclosure Document Deposit Request for "Hose Straightening Device for Straightening Sprinkler or Drip-Head Bearing Garden Type Hoses," was filed on Jun. 28, 2002, and accorded Disclosure Document No. 513965.

BACKGROUND OF THE INVENTION

In the field of horticulture, there exist a wide variety of systems and accessories for watering gardens and other landscaped areas. Of the more popular implements are do-it-yourself watering systems that are sold with basic parts that need assembly in order to complete a customized watering system. One of the most successful of these products is sold in kits containing among other accessories, a main water delivery conduit and smaller diameter extension conduits that can be attached to the main delivery conduit.

Lengths of the main delivery conduit and extension conduits can be purchased in custom lengths as required. Accessories such as conduit plugs, t-junctions, elbows, and the like are provided to help construct the shape of the system over a given landscape. Watering-head accessories such as drip-heads and range-angle sprinkler heads are provided to facilitate different types of watering needs. The accessories are also sold separately from the original kit.

The only tools required to set up a do-it-yourself watering system like the one described above are a pair of scissors or knife to cut desired lengths of conduit and a puncture tool to provide a seat for threading in the sprinkler heads at desired locations along the conduit length. Special fittings are also provided for adapting, for example, a 0.750" diameter main delivery conduit to standard water faucet outlets. Ease of assembly makes. the system popular to many household users.

In general deployment of such systems, the main delivery conduit is laid-out along an area that will be watered. Extension conduits supporting drip heads and the like may be run from the main delivery conduit directly to plants being watered. Sprinkler heads are typically applied at desired spots along the main conduit by using a puncture tool for starting them and then threading the heads in until they are seated on the main conduit. The heads are rotated once installed toward the plant or plants that they will supply. 90-degree to 360-degree watering ranges are possible by providing a head with the suitable range capability.

A specific problem exists in the above-described type of system in that after laying out the main conduit and installing the required watering accessories to reach plants, the conduit has a pre-disposition for longitudinal twisting over time. This twisting problem is aggravated by heat and cool-down fluctuations typical of summer weather patterns. In some geographic regions where hot days are followed by much cooler nights the twist problem is much more pronounced. Twisting of the main conduit after sprinkler-head installation causes the installed heads to go out of perpendicular alignment such that they are no longer pointing at the correct elevation for watering. Some may begin to point upward while others may point into the ground causing the water stream to fall short of the watering target.

Stakes can be used to stake the main delivery conduit to the ground; however the stakes do not provide any insurance against longitudinal twisting of the conduit. One way to prevent twisting is to board the main conduit by clamping it every several inches along the path to a baseboard or running board by drilling pilot holes and using half-clamps to screw the conduit securely to the board. While this method may prevent twisting provided the clamps are compressing the conduit sufficiently against the board, the cost and work required to accomplish the set-up is more than most users are willing to put up with. Moreover, the presence of the boards themselves can be unsightly in a landscape.

Therefore, what is clearly needed is a conduit clamp that can easily be applied along desired points of the main delivery conduit to prevent and/or correct conduit twisting. Such a device can be provided economically as an accessory for various diameter conduits, and can be un-clamped and moved to different points along the conduit if desired.

SUMMARY OF THE INVENTION

In a preferred embodiment of the present invention, in a conduit system subject to twisting of a conduit around a longitudinal axis, a staking device for fixing the conduit in position on a ground surface is provided, comprising a clamping apparatus having gripping elements on an inside surface of an opening substantially the size and shape of a cross section of the conduit, the clamping element openable to fit over the conduit and closable to clamp to the conduit such that the conduit may not rotate relative to the clamping element, a stake adapter mounted to the clamping apparatus, the stake adapter having a sleeve opening with an opening of a first size first and a longitudinal axis substantially tangential to the clamping element, and a stake having a length and substantially the first diameter to slide into the sleeve opening and into the ground surface, to pin the conduit securely to the ground surface, preventing rotation of the conduit.

In preferred embodiments the stake further comprises an upper portion having a shape following the shape of the clamping element, such that with the stake inserted the upper portion of the stake engages the clamping element to aid in pinning the clamping element and the captured conduit to the ground surface. The conduit may be circular in cross section, and the inside opening of the clamping element may be also circular. In some embodiments the clamping device is formed of a first and a second portion, the first joined to the second by a hinge to make the device openable, and wherein the clamping device further comprises a latching mechanism opposite the hinge for latching the device closed to grip the conduit.

In another aspect of the invention a method for fixing a conduit to a ground surface to prevent longitudinal twisting of the conduit is provided, comprising the steps of (a) closing a clamping apparatus having gripping elements on an inside surface of an opening substantially the size and shape of a cross section of the conduit, the clamping element openable to fit over the conduit and closable to clamp to the conduit, over the conduit at a selected position; and (b) passing a stake through a stake adapter mounted to the clamping apparatus and into the ground surface, the stake adapter having a sleeve opening of a first size and a longitudinal axis substantially tangential to the clamping element.

In yet another embodiment a method for resetting a twisted conduit to a ground surface to realign directional elements attached to the conduit is provided, comprising the steps of (a) closing a clamping apparatus having gripping elements on an inside surface of an opening substantially the size and shape of a cross section of the conduit, the clamping element openable to fit over the conduit and closable to clamp to the conduit, over the conduit at a selected position; (b) rotating the conduit and clamping element to reposition the directional element; and (c) passing a stake through a stake adapter mounted to the clamping apparatus and into the ground surface, the stake adapter having a sleeve opening of a first size and a longitudinal axis substantially tangential to the clamping element.

BRIEF DESCRIPTION OF THE DRAWING FIGURES

DESCRIPTION OF THE PREFERRED EMBODIMENTS

For the first time an apparatus and method is provided for easily and economically securing a main water delivery conduit along a desired path for watering a target area, such as a garden, landscaping, or lawns, such that in its secured position the main delivery conduit is prevented from longitudinal rotation, or twisting, and in the case that such longitudinal rotation has already occurred in the main water delivery conduit, the apparatus and method of the present invention may be used to correct such longitudinal rotation while also securing the main water delivery conduit in the desired position in the watering area. The present invention is described in enabling detail below.

Figure 1:
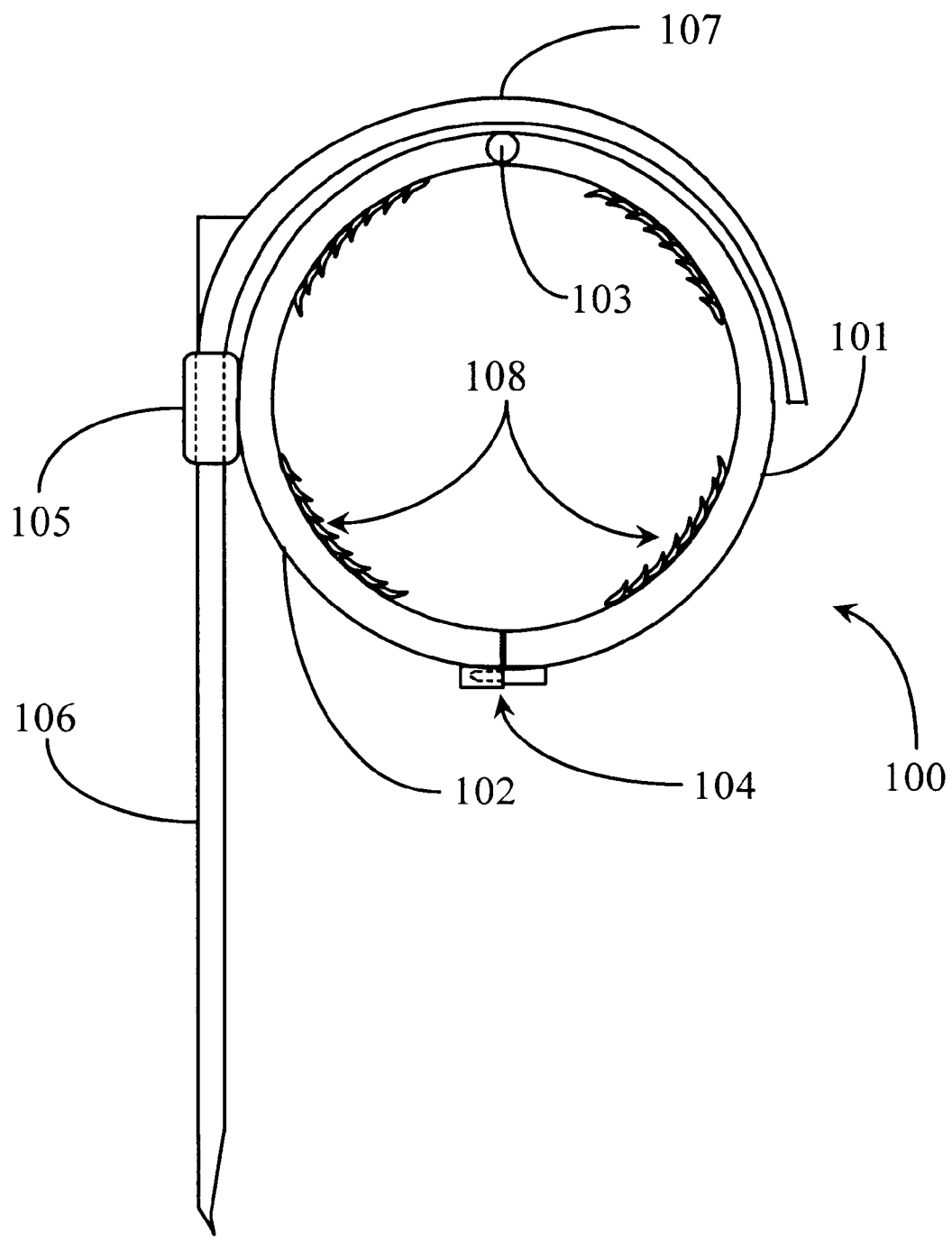
FIG. 1 is an elevation view of an anti-twist conduit clamp according to an embodiment of the present invention.

FIG. 1 is an elevation view of an anti-twist conduit clamp according to an embodiment of the present invention. Clamping device 100, in a preferred embodiment is provided for securing a main water delivery conduit along a desired path for watering a target area, such that the main delivery conduit is prevented from longitudinal rotation, or twisting, and in the case that such longitudinal rotation has already occurred, clamping device 100 corrects such longitudinal rotation while also securing the main water delivery conduit in the desired position in the watering area. Clamping device 100 comprises a set of C-shaped ring sections, each ring section, in a preferred embodiment, being equal in size and shape. Ring section 101 and ring section 102 form a circular enclosure when joined together as illustrated in the figure, the circular enclosure having an inside diameter that is slightly larger than the outside diameter of a main water delivery conduit (not shown), which clamping device 100 is designed to secure. It will be noted that in various embodiments of the present invention, the inside diameter of the circular shape formed by the ring sections, as shown, will vary depending upon the outside diameter of the main delivery conduit onto which device 100 is clamped. Therefore, many different sizes of clamping device 100 may be manufactured to accommodate a variety of different sizes of conduits.

In the preferred embodiment shown in FIG. 1, one end of each of sections 101 and 102 are rotatably joined together by a hinge element 103, such that each ring section may be rotated outwardly from the other, joined at hinge 103, allowing clearance between the un-hinged ends of each ring section such that the hinged assembly may be clamped onto the outer circumference of a main delivery conduit (not shown) to be secured. Although clamping device 100 in a preferred embodiment, as shown, has two sections forming a circular ring, it is noted that in other embodiments of the invention, there may be a greater number of ring sections than are shown in FIG. 1. Further to the above, the shape that is formed by joining of the plurality of sections may be other than a circular shape, as a shown in FIG. 1, depending primarily on the shape of the outer circumference of the delivery conduit to be secured. Still further to the above, the inventor wishes to note that in alternate embodiments of the present invention, a joining apparatus other than a hinge may be used for rotatably joining of the first ends of the ring sections of the device, such as a hooking mechanism, or other similar arrangement. Such varying means of joining the first ends of the ring sections may be utilized in various embodiments of the present invention without departing from the overall scope and spirit of the invention.

Attached to, or otherwise formed into each of the un-hinged ends of ring sections 101 and 102, are components of a closure apparatus 104, shown in the illustration of FIG. 1 at the bottom of the ring formed by sections 101 and 102, directly opposite the location of hinge 103. In the embodiment illustrated a simplified closure apparatus 104 comprises a male portion on the un-hinged end of section 101, and a female portion on the un-hinged end of section 102. Although great detail is not shown in the illustration for reasons of simplicity, the male and female portions of the closure apparatus are enabled such that, with the use of, for instance, a ring and groove configuration for some similar method, the male portion of closure apparatus 104, when inserted fully into the female portion, snaps together with the female portion thereby securing ring sections 101 and 102 together to form a secure ring. A variety of snap methods may be used to secure closure apparatus 104 into a closed position. In a preferred embodiment, closure apparatus 104 may be unlocked by a user so that ring 100 may be removed after installation, perhaps relocated to another position on the conduit.

Located on the inside surface of each of ring sections 101 and 102, a plurality of gripping surfaces 108 are provided in the embodiment shown for enabling positive gripping action of device 100 when attached to a main conduit according to embodiments of the present invention. Gripping surfaces 108, in a preferred embodiment, comprise an arrangement of apertures or teeth, which are substantially slanted in a unidirectional manner similar to the arrangement found in a typical and well-known cheese-grating device. Such a slanted arrangement of teeth or apertures substantially reduces the possibility of the conduit being clamped by device 100 from rotating in the direction against the slant of the teeth or apertures. In alternative embodiments, however, the arrangement of the gripping protrusions of gripping surfaces 108 may differ significantly. For example, the gripping protrusions may all slant in one direction or the other, or the individual gripping protrusions may slant in an alternative direction to each other, or the gripping protrusions may not slant at all, but instead may protrude vertically from gripping surface 108. The purpose of unidirectional slant is to provide, in one embodiment, an effective method of correcting twist that has already occurred in a conduit section. The direction of slant of the apertures, in a preferred embodiment is used to leverage the conduit in-an anti-twist direction and then hold the conduit from the natural tendency to revert to the original twisted configuration.

In one embodiment of the invention, gripping surfaces 108 may instead be provided as 2 instead of 4 surfaces one per each half-ring of device 100. Gripping surfaces 108 are shown in the illustration of FIG. 1 as a plurality of separate surfaces evenly spaced in locations on the inner surfaces of ring sections 101 and 102, such that even and secure gripping of a main delivery conduit is accomplished upon closing of the ring sections around the conduit, and securing with closure apparatus 104. In alternative embodiments of the present invention, however, the gripping surfaces may be located differently from that shown, on the inner surfaces of sections 101 and 102, or may cover the entire inner surface of the ring formed by sections 101 and 102, thereby providing a gripping surface which substantially covers the entire circumference of a main delivery conduit which is being secured by clamping device 100.

In one embodiment of the present invention, the teeth or gripping apertures of surfaces 108 may be formed contiguously with ring sections 102 and 103 in a molding process using a durable polymer. In another embodiment, gripping teeth or apertures of surfaces 108 may be formed into a metal inlay or insert provided for each ring section, and the gripping surfaces may be removably attached to the inner surfaces of the ring sections, such that alternate gripping surfaces may be utilized in device 100 for clamping various types of conduits manufactured of different materials. Conduit that develops rotational twist under heat-cold cycles will be relatively pliable such as most polymer based delivery hoses. Therefore, the length of the apertures shall not be such that puncture is possible.

In the embodiment shown in FIG. 1, upon closure of sections 101 and 102 around main delivery conduit, and securing of closure apparatus 104, the teeth or apertures of gripping surfaces 108 come into contact with the outer surface of the conduit material which is being clamped, slightly penetrating into the conduit material, but only deeply enough into the material to secure the conduit in order to prevent longitudinal rotation or slipping, without causing any undue damage to the outer conduit material. When secured against the direction of twist already occurred in a section of conduit, the apertures grab the material as it attempt to rotate (unidirectional slant embodiment).

A sleeve 105 is provided in the embodiment presented, attached to, or otherwise formed into the outside surface of ring section 102. Sleeve 105 is adapted to receive a stake 106 through an opening provided there through. Stake 106 is for securing clamping device 100 along with the main delivery conduit being secured, to the ground. When inserted, stake 106 runs tangent to the surface of ring 107 so that it may be leveraged to correct rotational twist that is already present in a section of conduit.

Stake 106 differentiates from a conventional stake, such as a common tent stake, for example, in that stake 106 has a semi-circular head portion 107 that follows over sections 101 and 102, while they are in the closed position, clamped onto a delivery conduit and staked into the ground or other surface. As mentioned above for ring sections 101 and 102, the half-circle formed by head portion 107 of stake 106, as is shown in FIG. 1, may be of a variety of different shapes and sizes in various embodiments of the present invention, depending on the size and shape of the main delivery conduit to be secured, and is manufactured of a size and shape in accordance with the size and shape formed by the ring sections of clamping device 100. Head portion 107 may be an integral part of, or fixedly attached to stake 106, or in other embodiments of the present invention may be removably attached to stake 106 in order to facilitate different combinations of sizes of stakes and ring sections forming the enclosure for securely clamping a main delivery conduit.

Figure 2:
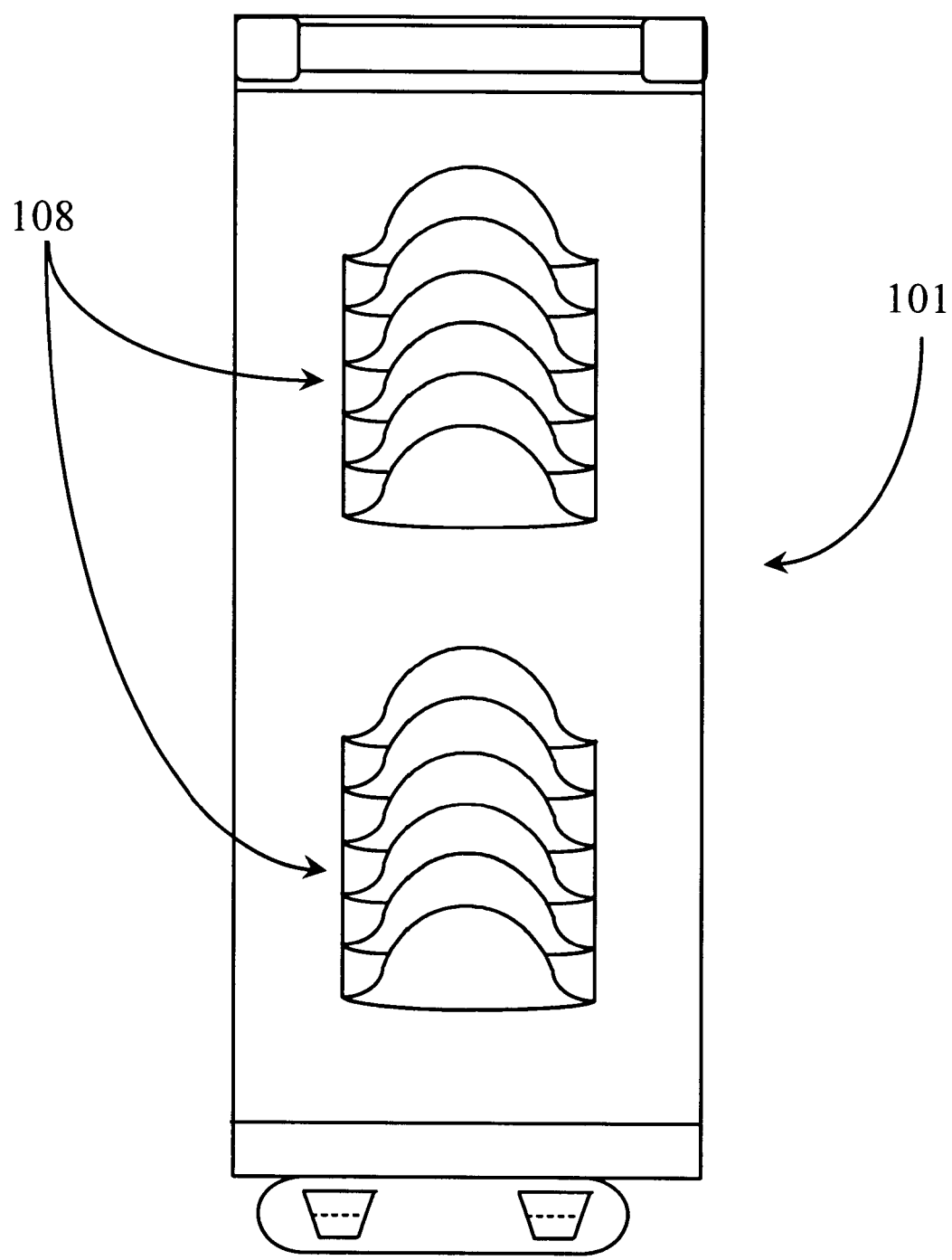
FIG. 2 is an elevation view of one ring section of the conduit clamp of FIG. 1, rotated to illustrate the inner surface and gripping surfaces according to an embodiment of the present invention.

FIG. 2 is an elevation view of ring section 101 of FIG. 1, rotated to illustrate the inner thereof according to an embodiment of the present invention. For perspective, hinge 103 is shown in this view at the upper portion of ring section 101, and a portion of closure apparatus 104 can be seen at the bottom end of section 101. As can be clearly seen in this view, the plurality of protrusions of each gripping surface 108 are rounded at the outer surface, such that upon closure of clamping device 100 around a main delivery conduit, undue damage or marring to the pliable material of the outer surface of the main delivery conduit is avoided. The protrusions of gripping surfaces 108 are also shown in this view arranged in a slanted, one-way direction such that significantly greater gripping capacity against the direction of twist is enabled for clamping device 100, effectively stopping longitudinal twist in one direction. For application to prevent twist that has yet to occur, one of the inserts 108 may be reversed in direction to stop twist that may occur in either direction. As previously mentioned, however, the size, shape or arrangement, or direction of protrusion of the teeth or other gripping apertures of gripping surface 108 may differ substantially in various embodiments, or may cover the entire inner surface both the ring were other shape formed by the hinged sections of clamping device 100, without departing from the scope and spirit of the invention.

Figures 3A, 3B:
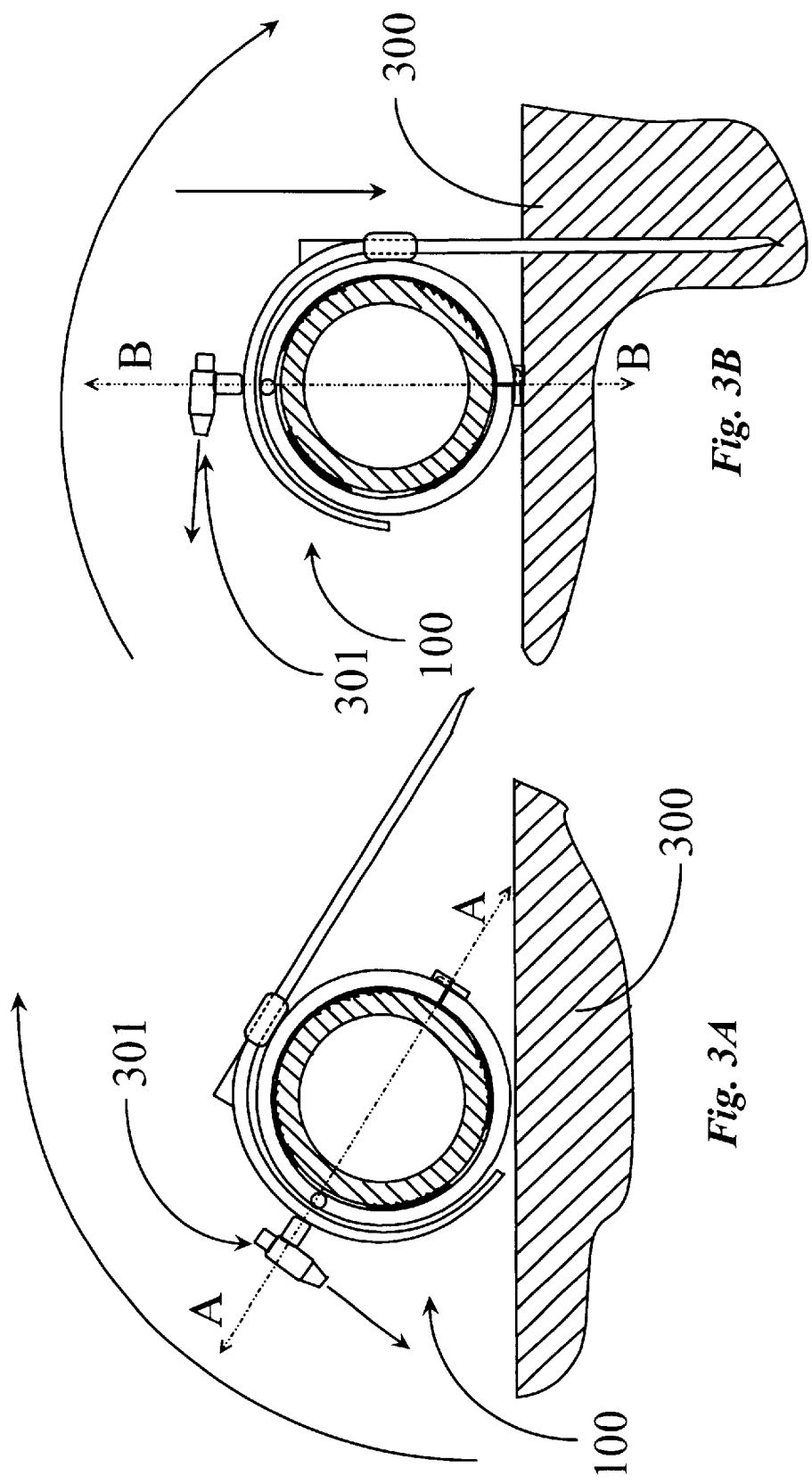
FIG. 3A is an elevation view of the conduit clamp of FIG. 1, securing a section of main delivery conduit with sprinkler heads inserted therein.
FIG. 3B is an elevation view of the clamping device of FIG. 3A rotated to achieve desired alignment and inserted into the ground according to an embodiment of the present invention.

FIG. 3A is an elevation view of clamping device 100 of FIG. 1, securing a section of main delivery conduit with sprinkler heads inserted therein. It is assumed in this example that rotational twist already exists and must be corrected. The clamping device of the present invention provides a means and apparatus for securely clamping a main water delivery conduit in order to correct, in this example, pre-existing longitudinal rotation of the main delivery conduit that may have occurred after installation of the main delivery conduit in the watering target area. By utilizing the clamping device of the present invention, the user is enabled to leverage the position of the main delivery conduit to correct alignment of any sprinkler heads or watering extension insert taps in relation to elevation and direction.

A sprinkler head 301 is illustrated in this example in a misaligned position (pointing toward ground 300) caused by rotational twist in the particular section of conduit local to the sprinkler head due, typically, to temperature changes over time. Head 301 is typical in design and is adapted to disperse water in a steam or spray to the desired watering target.

In practice of the invention, a user applies device 100 to a position on the conduit adjacent on either side of sprinkler head 301. Device 100 is clamped over the conduit without the stake in place such that the sleeve receiving the stake is substantially parallel with the longitudinal axis of head 301 in line with axis A—A. With device 100 clamped and locked into position, it is noted that the gripping teeth are leaning in the proper direction for leveraging out the rotational twist causing the misalignment of head 301. A user then inserts the stake through the sleeve and can now use the stake as a lever to rotate the conduit in the required direction to realign head 301 to a proper elevation for watering as will be discussed with reference to FIG. 3B.

FIG. 3B is an elevation view of the clamping device of FIG. 3A securing the conduit with a sprinkler head inserted therein, rotated to correct rotational twist and inserted into the ground according to an embodiment of the present invention. As can be clearly seen in this view, clamping device 100 has been rotated or leveraged from the position illustrated in FIG. 3B in the direction indicated, to correct the longitudinal twist of the conduit. A vertical axis line B—B is achieved wherein sprinkler head 301 is now elevated properly and device 100 is staked into ground 300. The gripping teeth prevent the conduit from relaxing back to the twisted position.

In practice of the present invention, where there is no pre-existing longitudinal rotation, or twisting, of conduit 302, with reference again to FIG. 3B, a user may prevent longitudinal rotation of conduit 302 by first setting up the watering system where in conduit 302 is laid out in the area to be watered, and the sprinkler heads, represented by sprinkler head 301, are pointing in the desired direction and elevation. The user then installs a plurality of clamping devices 100 along lengths of conduit 302, preferably at points adjacent to the sprinkler heads and positions them such that sleeve 105 is perpendicular to the ground and parallel to the sprinkler head axis' and stakes them down thereby securing the position of sprinkler head 301 against longitudinal rotation of the conduit. It is noted herein that in the case of twist prevention, the direction of one of the inserts in each ring of device 100 may be reversed so that twist in either direction is discouraged.

One with skill in the art will recognize that the methods and apparatus of the present invention in the various embodiments will prevent rotational twist and will correct existing rotational twist in conduits typically used for landscape watering and other fluid delivery purposes. In addition to sprinkler heads installed in the main conduit, the positions of other components such as smaller conduit leadoffs and the like may be corrected is subverted through twisting of the conduit.

The method and apparatus of the present invention achieves and maintains the correct positioning of sprinkler heads and other water delivery components and tap inserts that have been inserted into the main water delivery conduit, which insures accurate water delivery.

One with skill in the art will also recognize that a main delivery conduit for delivering water as described in the present application and as the subject of the advantages of the invention is exemplified only because it is the most common application for practicing the invention. Practice of the present invention is not limited to securing and correcting twist rotation in a main delivery conduit for delivering water, as many types of delivery conduits and fluids being delivered through them may also benefit from the advantages produced by the invention. Accordingly, many different applications other than watering plants in a garden or landscape, for example, may benefit from the present invention without departing from the overall spirit and scope of the invention. For these reasons, the present invention should be afforded the broadest possible scope under examination. The spirit and scope of the invention is limited only by the claims that follow.

What is claimed is:

1. In a conduit system subject to twisting of a conduit around a longitudinal axis, a staking device for fixing the conduit in position on a ground surface, comprising:

a clamping apparatus having gripping elements on an inside surface of an opening substantially the size and shape of a cross section of the conduit, the clamping apparatus openable to fit over the conduit and closable to clamp to the conduit such that the conduit may not rotate relative to the clamping apparatus;

a stake adapter mounted to the clamping apparatus, the stake adapter having a sleeve opening of a first diameter and a longitudinal axis substantially tangential to the clamping apparatus; and a stake having a length and substantially the first diameter of the sleeve opening, and comprising an upper portion having a shape following the shape of the clamping apparatus, such that with the stake inserted the upper portion of the stake engages the clamping apparatus to aid in pinning the clamping apparatus and the captured conduit to the ground surface, the stake for sliding into the sleeve opening and into the ground surface, to pin the conduit securely to the ground surface, preventing rotation of the conduit;

charaterized in that the clamping apparatus is formed of a first and a second portion, the first joined to the second by a hinge to make the clamping apparatus openable, and wherein the clamping apparatus further comprises a latching mechanism opposite the hinge for latching the clamping apparatus closed to grip the conduit.

2. The staking device of claim 1 wherein the gripping elements of the clamping apparatus are formed contiguously with the clamping apparatus in a molding process.

3. The staking device of claim 1 wherein the conduit is circular in cross section, and the inside opening of the clamping apparatus is also circular.

4. The staking device of claim 1 wherein the gripping elements of the clamping apparatus are removable inserts.

5. The staking device of claim 4 wherein the gripping elements are directionally installed depending on application.

6. A method for resetting a twisted conduit to a ground surface to realign directional elements attached to the conduit, comprising the steps of:

(a) closing a clamping apparatus having gripping elements on an inside surface of an opening substantially the size and shape of a cross section of the conduit, the clamping apparatus formed of a first and a second portion, the first joined to the second by a hinge to make the clamping apparatus openable to fit over the conduit and further comprising a latching mechanism opposite the hinge for latching the clamping apparatus closed to clamp to the conduit, over the conduit at a selected position;

(b) rotating the conduit and clamping apparatus to reposition the directional element; and (c) passing a stake through a stake adapter mounted to the clamping apparatus and into the ground surface, the stake adapter having a sleeve opening of a first diameter and a longitudinal axis substantially tangential to the clamping apparatus, the stake having a length and substantially the first diameter of the sleeve opening, and comprising an upper portion having a shape following the shape of the clamping apparatus, such that with the stake passed through the opening of the stake adapter, the upper portion of the stake engages the clamping apparatus to aid in pinning the clamping apparatus and the captured conduit to the ground surface.

7. A method for fixing a conduit to a ground surface to prevent longitudinal twisting of the conduit, comprising the steps of:

(a) closing a clamping apparatus having gripping elements on an inside surface of an opening substantially the size and shape of a cross section of the conduit, the clamping apparatus formed of a first and a second portion, the first joined to the second by a hinge to make the clamping apparatus openable to fit over the conduit and further comprising a latching mechanism opposite the hinge for latching the clamping apparatus closed to clamp to the conduit, over the conduit at a selected position; and (b) passing a stake through a stake adapter mounted to the clamping apparatus and into the ground surface, the stake adapter having a sleeve opening of a first diameter and a longitudinal axis substantially tangential to the clamping apparatus, the stake having a length and substantially the first diameter of the sleeve opening, and comprising an upper portion having a shape following the shape of the clamping apparatus, such that with the stake passed through the opening of the stake adapter, the upper portion of the stake engages the clamping apparatus to aid in pinning the clamping apparatus and the captured conduit to the ground surface.

* * * * *